United States Patent [19]

Kanouda et al.

[11] Patent Number: 5,280,228
[45] Date of Patent: Jan. 18, 1994

[54] INVERTER CIRCUIT

[75] Inventors: Akihiko Kanouda; Hideki Miyazaki; Kouzou Watanabe; Kenichi Onda, all of Hitachi, Japan

[73] Assignee: Hitachi, Ltd., Tokyo, Japan

[21] Appl. No.: 672,410

[22] Filed: Mar. 20, 1991

[30] Foreign Application Priority Data

Mar. 20, 1990 [JP] Japan .................. 2-68261

[51] Int. Cl.⁵ .................. H02P 5/40; H02M 3/24
[52] U.S. Cl. .................. 318/803; 318/801; 363/98
[58] Field of Search .............. 318/798, 800, 801, 802, 318/803, 805-811, 685; 363/98, 97

[56] References Cited

U.S. PATENT DOCUMENTS

| 4,031,448 | 6/1977 | Adachi | 318/685 |
| 4,698,744 | 10/1987 | Itani et al. | 318/811 |
| 4,825,132 | 4/1989 | Gritter | 318/811 |
| 4,947,309 | 8/1990 | Jonsson | 363/98 |
| 4,979,056 | 12/1990 | Squires et al. | 360/69 |
| 4,994,950 | 2/1991 | Gritter | 318/811 |
| 5,170,310 | 12/1992 | Studtmann et al. | 361/94 |

OTHER PUBLICATIONS

GESmart Module Simplifies Motor Drive Design; General Electric Semiconductor (GE Application Note Pub. #200.96) Nov. 1985.

Primary Examiner—William M. Shoop, Jr.
Assistant Examiner—John W. Cabeca
Attorney, Agent, or Firm—Antonelli, Terry, Stout & Kraus

[57] ABSTRACT

A three-phase bridge inverter for controlling a motor with a variable speed includes a drive circuit therefor and an overcurrent protection circuit on one integrated chip. The inverter IC can be operated by directly inputting a direct current obtained by rectifying commercial 100 V. Thus, the inverter chip reduces the size and the weight of a system, improves the usability, lowers the cost thereof and permits mass production fabrication. Also, the life of the IC is increased by detecting current flowing through the inverter and the temperature of the chip and stopping the operation, when an abnormality is found.

20 Claims, 9 Drawing Sheets

FIG. 8a  U 
FIG. 8b  V 
FIG. 8c  W 
FIG. 8d  PWM 
FIG. 8e  $U^+$ 
FIG. 8f  $V^+$ 
FIG. 8g  $W^+$ 
FIG. 8h  $U^-$ 
FIG. 8i  $V^-$ 
FIG. 8j  $W^-$ 

INVERTER CIRCUIT

BACKGROUND OF THE INVENTION

The present invention relates to a semiconductor integrated circuit, and in particular to an inverter circuit including a three-phase bridge for converting direct current into alternating current.

Heretofore, a three-phase bridge inverter circuit is used for controlling the rotation speed of a brushless motor, an induction motor, etc. A prior art inverter circuit used for these uses was composed of output semiconductor switching elements and drive circuits therefor combined with parts for individual elements.

As a prior art technique, by which such an inverter circuit is modularized in a small size, there is known a technique discribed e.g. in "GESmart MODULE SIMPLIFIES MOTOR DRIVE DESIGN", GE Application Note Pub. #200.96, Nov., 1985.

By this prior art technique, a half bridge, in which two switching elements corresponding to one phase of an inverter are connected in series with each other, is accommodated in one module together with drive circuits for the respective elements, in order to reduce the size and improve the usability.

By the prior art technique described above, as a measure for reducing the volume of an inverter circuit, a part corresponding to one phase of an inverter is modularized. Three modules are necessary for driving a brushless motor, an induction motor, etc. with variable speed, using modules according to the prior art technique described above.

For this reason, the prior art technique described above cannot deal with the requirement to integrate inverters in a chassis within a motor.

In order to solve such a problem, it is desired to form inverters in the form of a monolithic IC capable of reducing remarkably the volume thereof by integrating parts corresponding to three phases in an IC altogether. However, in order to obtain a voltage corresponding to the commercial voltage, which is 100 V, a withstand or breakdown voltage of 250 V between different switching elements within the IC is required.

In the case where an inverter circuit having such a withstand or breakdown voltage between different elements is composed of an IC fabricated by a process of the prior art pn junction isolation method, a problem arises that the chip area is increased significantly for the purpose of increasing the withstand or breakdown voltage between different elements. Further, because of the fact that the potential at an output is varied in a pulse-like manner by on-off operation of an output switching element in a bridge inverter, noise current flows through parasitic capacitance of another output switching element and another problem arises in that erroneous operations of the circuit take place in this way.

SUMMARY OF THE INVENTION

An object of the present invention is to provide an inverter circuit capable of solving the problematical points of the conventional technique described above, in which not only a three-phase bridge inverter circuit but also a motor controlling inverter circuit including an overcurrent protection circuit are integrated in the form of a monolithic IC.

According to an aspect of the present invention, the above object can be achieved by integrating six output semiconductor switching elements constituting a three-phase bridge inverter, drive circuits therefor, and a circuit for protecting the output semiconductor switching elements stated above on one dielectric isolating substrate altogether.

In an embodiment of the present invention, the six output semiconductor switching elements constituting the three-phase bridge inverter, the drive circuits therefor, a level shift circuit and an overcurrent protection circuit are formed on a dielectric isolating substrate altogether in the form of a monolithic IC.

For this reason wiring length for the inverter circuit can be very small, delay time by signal transmission is shortened, parasitic inductance can be almost eliminated, and it is possible to reduce noise at switching. Further protecting operation, in the case where overcurrent flows through the output switching elements, can be effected in an extremely short time and it is easy to vary a value set for the overcurrent depending on the temperature of the chip.

Furthermore, since the isolating method by a dielectric isolating substrate is used, it is not subjected to any influences of noise due to switching of other elements and thus it is possible to provide an inverter circuit having a high anti-noise property.

BRIEF DESCRIPTION OF THE DRAWINGS

FIGS. 8a to 8j show signal waveforms for explaining the operation of the embodiment indicated in FIG. 7.

DESCRIPTION OF THE PREFERRED EMBODIMENTS

Figure 1:
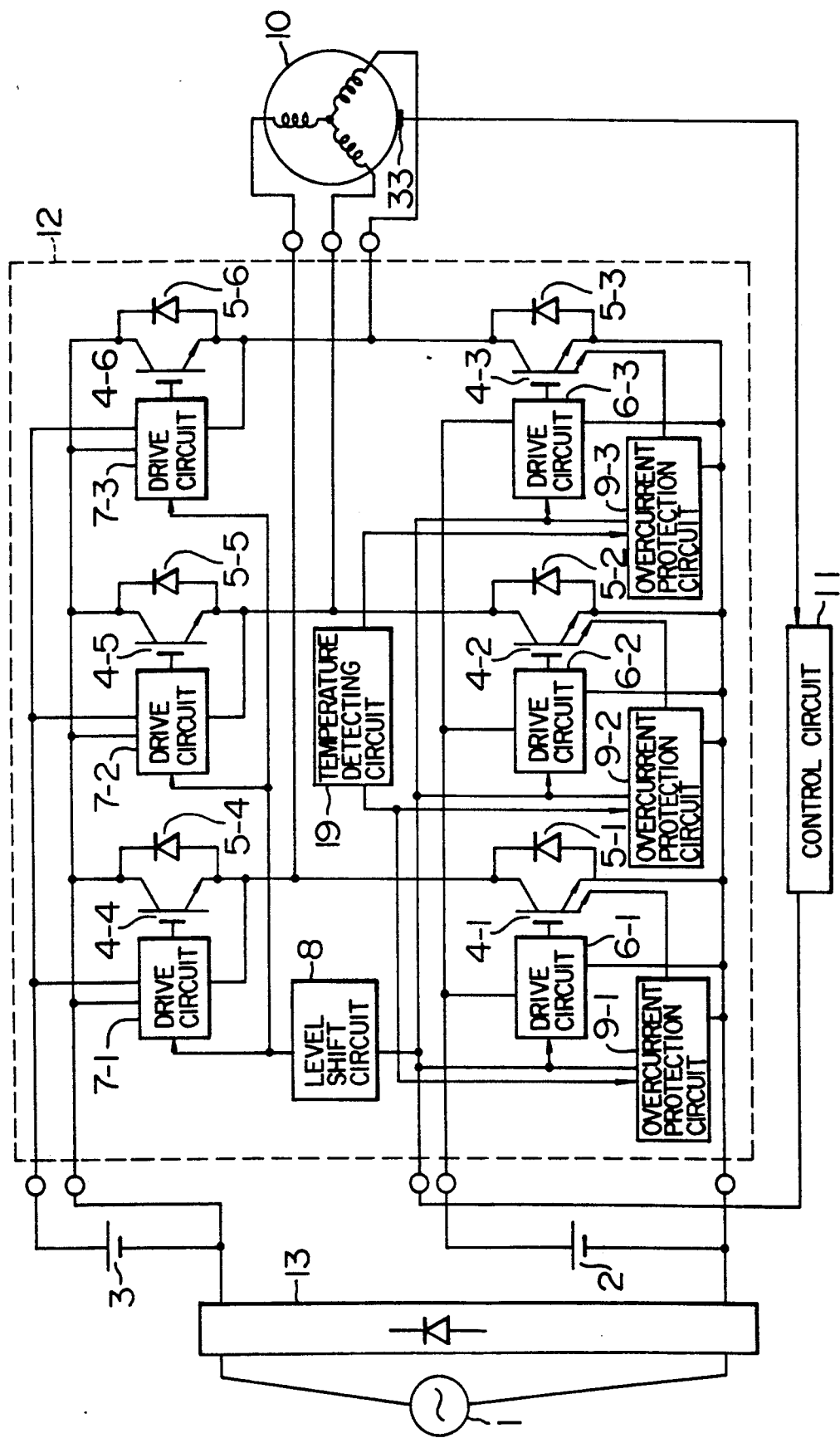
FIG. 1 is a block diagram showing a first embodiment of the present invention.

Hereinbelow several embodiments of the inverter circuit according to the present invention, will be explained, referring to the drawings.

Figure 2:
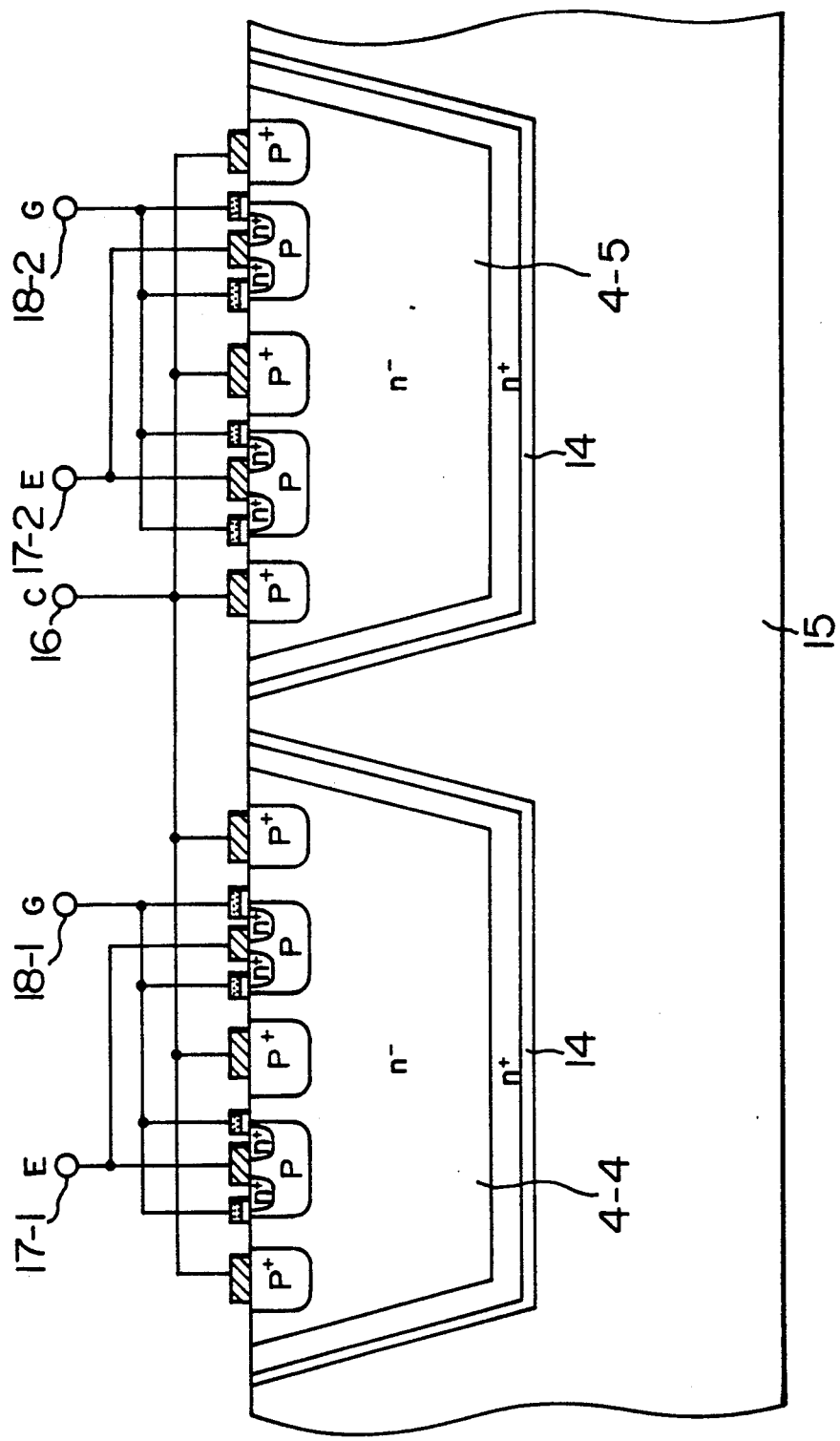
FIG. 2 is a cross-sectional view illustrating a part of the IC structure according to the present invention.
Figure 4:
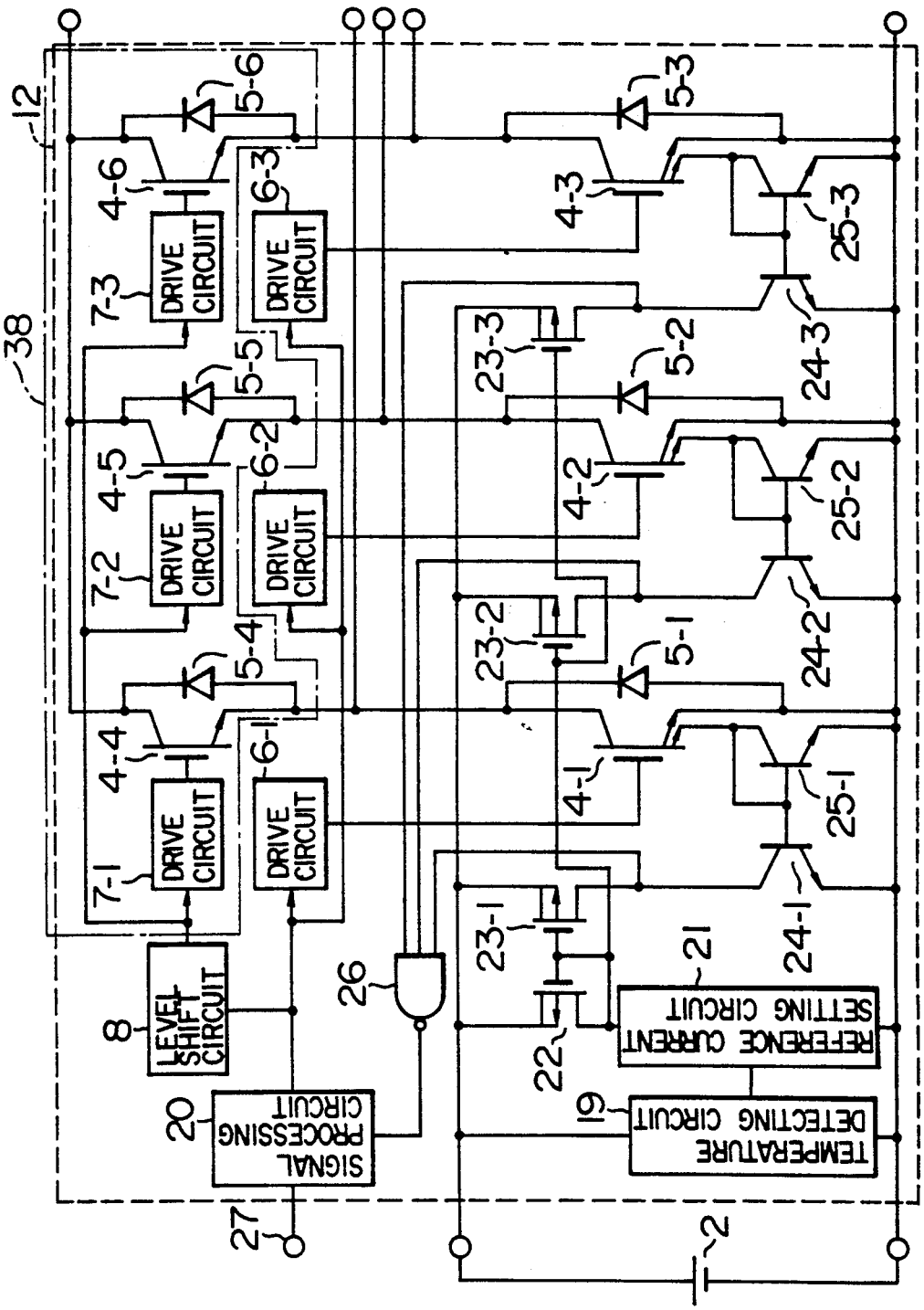
FIG. 4 is a block diagram indicating an embodiment of an overcurrent protection circuit section according to the present invention.

FIG. 1 is a block diagram indicating the circuit of the first embodiment of the present invention; FIG. 2 is a cross-sectional view indicating a part of the IC; and FIG. 4 is a diagram indicating overcurrent protection circuits 9-1 to 9-3 in detail. In FIGS. 1, 2 and 4, reference numeral 1 denotes an AC power supply; 2 and 3 DC voltage sources; 4-1 to 4-6 switching elements; 5-1 to 5-6 diodes; 6-1 to 6-3 lower arm drive circuits; 7-1 to 7-3 upper arm drive circuits; 8 a level shift circuit; 9-1 to 9-3 overcurrent protection circuits; 10 a motor; 11 a control circuit; 12 an inverter IC; 13 a rectifying circuit; 14 an $SiO_2$ oxide layer; 15 a base (polycrystalline silicon), 16 a collector terminal; 17 an emitter terminal; and 18 a gate terminal.

Further, 19 denotes a temperature detecting circuit; 20 a signal processing circuit; 21 a reference current setting circuit; 22, 23-1 to 23-3 FETs; 24-1 to 24-3, 25-1 to 25-3 bipolar transistors; 26 a NAND circuit; and 33 a Hall element disposed within the case of the motor.

In FIG. 1, the region enclosed by a broken line represents a three-phase monolithic inverter IC (hereinbelow called IC) 12 integrated according to the present invention.

In the first embodiment of the present invention, IGBTs (Insulated Gate Bipolar Transistors) 4-1 to 4-6 are used for the output semiconductor switching elements in the inverter. IGBTs having a multiemitter structure are used for the purpose of detecting current flowing therethrough for IGBTs 4-1 to 4-3 among them.

By the method using switching elements having a multiemitter structure as described above, since the ratio of the current flowing through the sense terminal to the main circuit current flowing through the emitter electrode is almost equal to the emitter area ratio of the element, if the emitter area ratio is chosen to be e.g. 1000:1, it is possible to set the current flowing on the detection side at 1/1000 of the main circuit current and an effect can be obtained that electric power capacity of a resistor for detection and loss are reduced with respect to those required in the case where the main circuit current is detected by the prior art technique.

Now the reason why the overcurrent protection circuits 9-1 to 9-3 are disposed only on the lower arm side, as described above, will be described.

In the usual inverter operation, since the main circuit current (load current) supplied from the power supply flows always through either one of the lower arm switching elements, it is possible to detect abnormal current by upper and lower arm short-circuit, interphase short-circuit, etc. to protect the switching elements thereagainst.

Although abnormal current by a ground short-circuit accident of a load and at the upper arm back current mode cannot be detected by these overcurrent protection circuits, since a gate short-circuiting circuit for the upper arm drive circuit serves to turn off the upper arm switching elements at this time, no overcurrent protection circuits are required for the upper arm switching elements.

Further diodes 5-1 to 5-6 are connected between the collector and the emitter of these IGBTs, respectively, in anti-parallel. IGBT 4-4 and IGBT 4-1 are connected in series through the rectifying circuit 13 between the two terminals of the AC power supply to form a closed circuit. IGBT 4-5 and IGBT 4-2 as well as IGBT 4-6 and IGBT 4-3 are connected in parallel thereto to form the main circuit of the three-phase inverter.

The respective connecting points of IGBT 4-1 and IGBT 4-4, IGBT 4-2 and IGBT 4-5 as well as IGBT 4-3 and IGBT 4-6 are output points of the inverter circuit, with which the motor 10 is connected.

The motor 10 is a brushless motor, which rotates, receiving the output of the IC 12 and in which the Hall element 33 mounted in the motor case detects the rotational position of the rotor, the motor position detection signal being inputted in the control circuit 11.

In order to turn on and off IGBT 4-1 to 4-3, which are the lower arm output semiconductor switching elements, the IGBT drive circuits 6-1 to 6-3 for the lower arm switching elements are connected between the gate and the emitter of IGBTs 4-1 to 4-3, respectively. Further, the overcurrent protection circuits 9-1 to 9-3 detecting currents flowing through IGBTs 4-1 to 4-3 to protect them against latch-up due to overcurrent are connected with current detecting emitter electrodes of IGBTs 4-1 to 4-3, respectively.

The DC power supply 2 is a power supply, whose low potential side is connected with that of the rectifying circuit 13 in common, and it is connected with the lower arm IGBT drive circuits 6-1 to 6-3 and the overcurrent protection circuits 9-1 to 9-3 to supply driving currents therefor.

Outside of the IC 12, there is disposed the control circuit 11 controlling the turning on and off of IGBTs 4-1 to 4-6. The control circuit 11 is connected with the Hall element 33 disposed within the case of the motor 10 as well as the lower arm IGBT drive circuits 6-1 to 6-3 and the overcurrent protection circuits 9-1 to 9-3 within the IC 12 and also with the upper arm IGBT drive circuits 7-1 to 7-3 through the level shift circuit 8.

In a usual inverter device, since it is necessary to give the upper arm switching elements a driving signal with a potential difference, which is equal to the voltage applied between the output terminals of the lower arm switching elements, the level shift circuit 8 described above is necessary.

Further, the low potential side of the DC power supply 3 acting as the power supply for driving the upper arm IGBTs is connected with the high potential side of the rectifying circuit 13 and the high potential side of the DC power supply 3 is connected with the upper arm IGBT drive circuits 7-1 to 7-3.

FIG. 2 shows a part of the cross-section of the monolithic inverter IC 12 indicated in FIG. 1, showing the connection relation for IGBTs 4-4, and 4-5.

This IC 12 is constructed by the dielectric isolating method. IGBTs 4-4 and 4-5 are formed in interiors enclosed by trapezoidal $SiO_2$ oxide layers 14, respectively, and on the polycrystalline silicon base 15. In this way IGBTs 4-4 and 4-5 are formed so as to be electrically completely isolated from other constituent elements. IGBTs 4-4 and 4-5 indicated in the figure are formed in the lateral structure, in which current flows laterally. Although the collector electrode 16 is used in common, the other two electrodes are isolated electrically from each other so as to be separated emitter electrodes 17-1, 17-2 and gate electrodes 18-1, 18-2.

That is, according to the first embodiment of the present invention described above it is possible to integrate a three-phase bridge inverter circuit having a small size and a high withstand or breakdown voltage, which is not influenced by noise, on one chip.

Figure 3:
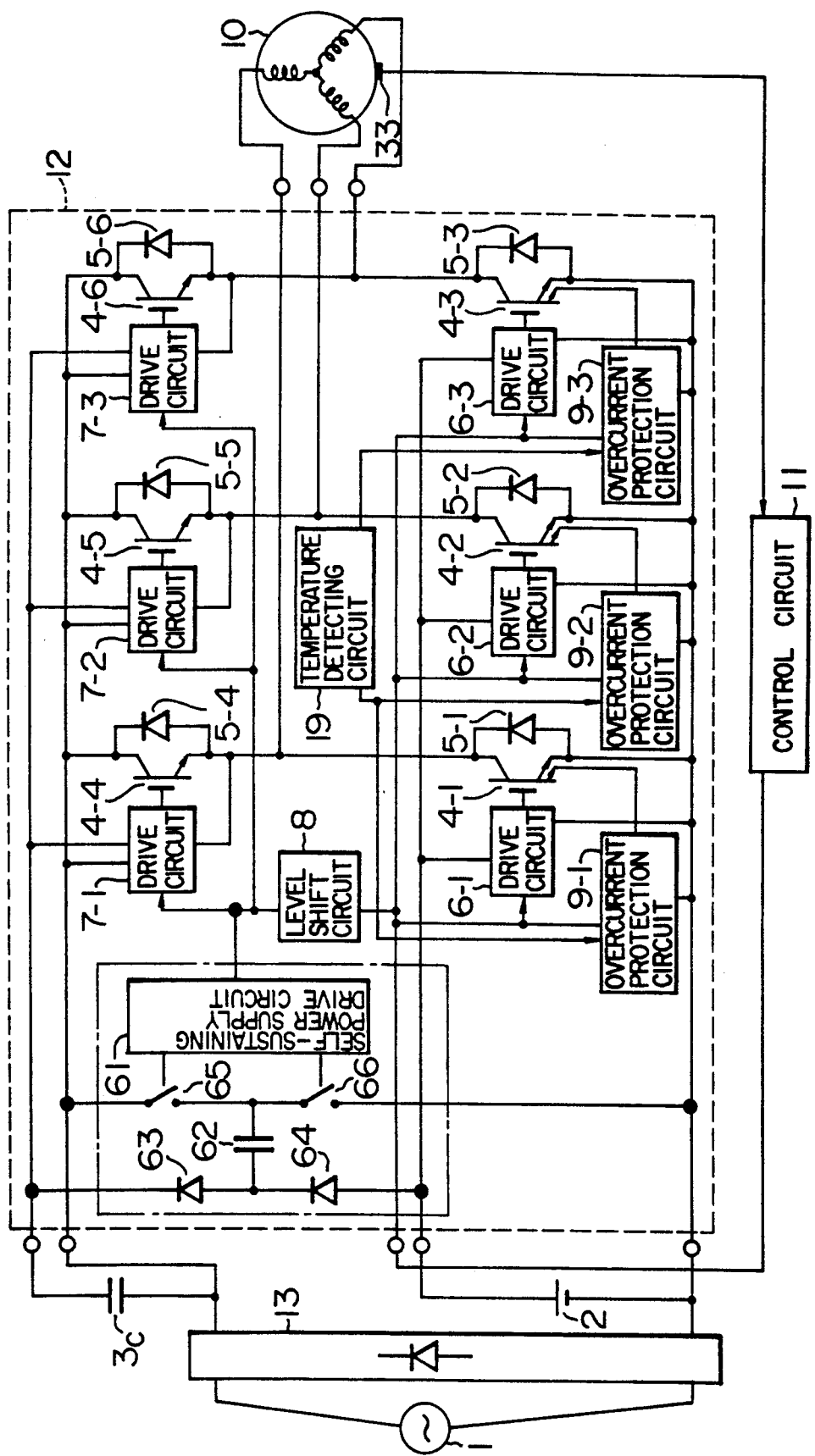
FIG. 3 is a block diagram showing a second embodiment of the present invention.

Further, in this figure, the temperature detecting circuit 19 is connected with the overcurrent protection circuits 9-1 to 9-3. By detecting precisely temperature variations of the main body of the circuit integrated on one chip by means of the temperature detecting circuit 19 in this way, the overcurrent set value can be varied, depending on the current level varying with the temperature variations, and at the same time, it is possible to stop the operation of the IC to intend the protection of the elements, when the IC is heated over a predetermined temperature. It is not always necessary to dispose the temperature detecting circuit 19 and the overcurrent protection circuits 9-1 to 9-3 within the IC chip. FIG. 3 shows another embodiment of the present invention.

In the embodiment indicated in this figure a self-sustaining power supplying circuit 60 is disposed in the inverter circuit integrated on one chip indicated in FIG. 1. By integrating this self-sustaining power supplying circuit in the IC the power supply for driving the upper arm switching elements, which was necessary heretofore, becomes unnecessary and an effect is obtained that it is sufficient to dispose only a capacitor 3c instead of the power supply 3, which was necessary heretofore for utilizing this IC.

Next the operation of this power supplying circuit will be explained.

A control signal from the control circuit 11 is given to a self-sustaining power supply drive circuit 61 through the level shift circuit 8. At first, the self-sustaining power supply drive circuit 61 gives a switch 66 an ON signal. When the switch 66 is turned on, current flows from the DC power supply 2 through a loop consisting of a diode 64, a capacitor 62 and the switch 66. Next, when the switch 66 is turned off and a switch 65 is turned on by a signal from the self-sustaining power supply drive circuit 61, current flows through another loop consisting of the capacitor 62, a diode 63, the capacitor 3c and the switch 65 and electric charge stored in the capacitor 62 is transferred to the capacitor 3c.

The capacitor 3c is charged by repeating this operation and the upper arm switching elements are driven by using this electric charge.

FIG. 4 illustrates a specific construction of the overcurrent protection circuits 9-1 to 9-3 indicated in FIG. 1.

In FIG. 4, the reference current setting circuit 21 is connected with the temperature detecting circuit so as to receive detected temperature signals from the temperature detecting circuit 19 and the output thereof is connected with the drain and the gate of FET 22. FET 22 is connected with FET 23-1, FET 23-2 and FET 23-3 so as to form a current mirror circuit. Transistors 24-1 to 24-3 are connected with FETs 23-1 to 23-3, respectively, and further these transistors are connected with transistors 25-1 to 25-3, respectively, so as to form current mirror circuits.

The connecting points of FET 23-1 to 23-3 with the transistors 24-1 to 24-3 are connected with input terminals of the NAND circuit 26 and the output terminal of the NAND circuit is connected with the signal processing circuit 20. Reference numeral 27 represents a signal input terminal from the control circuit 11.

Next the operation of the present embodiment will be explained.

In FIG. 1, the temperature detecting circuit 19 detects the temperature of the IC 12 and detected temperature information thus obtained is transmitted to the overcurrent protection circuits 9-1 to 9-3. In this way the overcurrent protection circuits 9-1 to 9-3 vary the overcurrent detection level, depending on the transmitted temperature information. That is, the overcurrent protection starting temperature is set so that the overcurrent protection circuits 9-1 to 9-3 lower the overcurrent detection level at a high temperature with respect to the overcurrent detection level, when the temperature of the IC 12 is low, and that the protection is started at a smaller current with increasing temperature. In this way, in the present embodiment, the inverter can be controlled with a high efficiency.

Each of the overcurrent protection circuits 9-1 to 9-3 includes the reference current setting circuit 21, the current mirror circuit described above and a comparator having one of FETs 23-1 to 23-3 and one of the transistors 24-1 to 24-3. The temperature information detected by the temperature detecting circuit 19 is transmitted to the reference current setting circuit 21 to vary the value of the reference current, depending on the temperature. The operation point of the comparator includes FETs 23-1 to 23-3 and the transistors 24-1 to 24-3 is varied by this reference current value. In this way, in the second embodiment of the present invention, it is possible to start the protection at a small current, when the IC 12 is heated at a high temperature.

Figure 5:
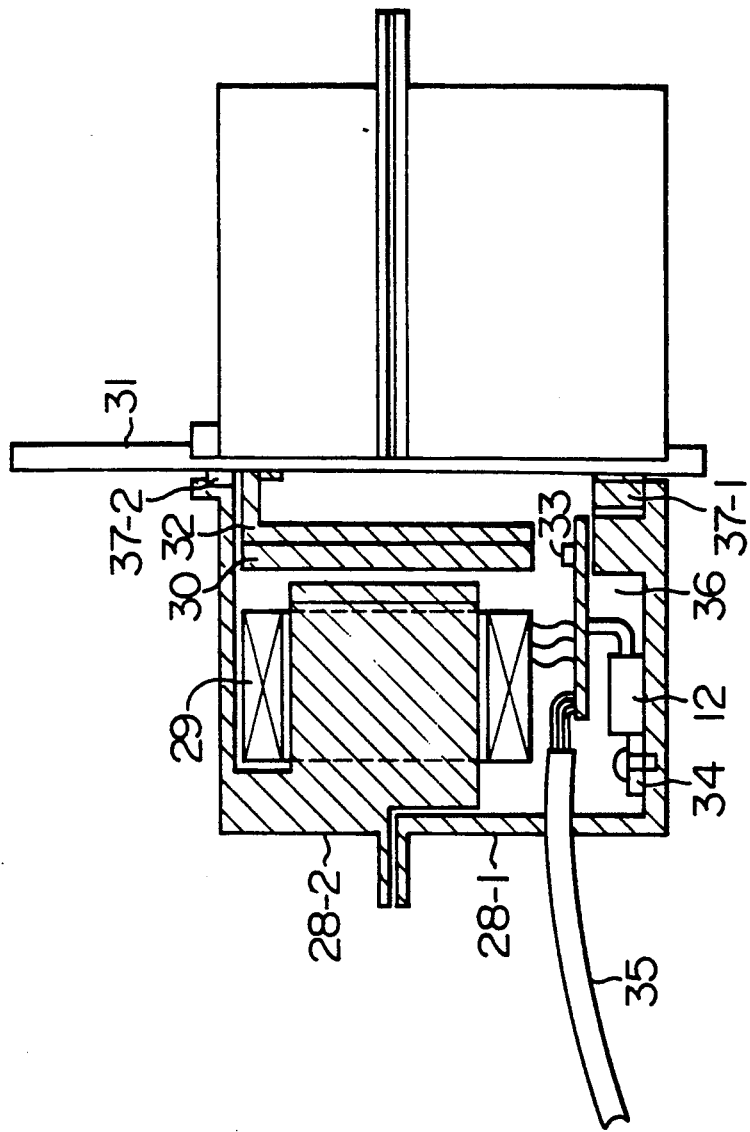
FIG. 5 is a diagram illustrating a third embodiment of the present invention.

FIG. 5 is a cross-sectional view of a brushless motor showing a third embodiment of the present invention. In FIG. 5, reference numeral 28-1 denotes a motor case; 28-2 a stator; 29 a coil; 30 a permanent magnet; 31 a shaft; 32 a rotor; 33 a Hall element; 34 a package of the inverter IC; 35 a shield cable; 36 a printed board; and 37-1 and 37-2 bearings.

The brushless motor indicated in FIG. 5 includes the motor case 28-1, th stator 28-2 and the rotor 32. The coil 29 is wound on the rotor 28-2 and the shaft 31 and the permanent magnet 30 are mounted on the rotor. The rotor 28-2 and the shaft 31 are coupled rotatably through the bearings 37-1 and 37-2.

The printed board 36 is mounted inside of the motor case 28-1 and the IC 12 according to the present invention and the Hall element 33 are mounted on the printed board 36. The IC 12 is accommodated in the package 34 having a cooling fin and secured to the motor case 28-1 by screws. Also, the coil 29 and the shield line 35 are connected with the printed board 36.

Next, an operation of the third embodiment of the present invention constructed as described above will be explained.

Electric power and control signals are inputted to the brushless motor indicated in the figure through the shield line 35 from the exterior and the signal representing the position of the rotor 32 detected by the Hall element 33 is outputted to the exterior of the motor. The IC 12 generates AC electric power controlling the motor to rotate it by receiving this control signal and performing the inverter operation so as to control the brushless motor with a variable speed.

Since the inverter circuit using the IC 12 can be incorporated within the motor case, as described above, the brushless motor is very suitable for reducing the size of the system and increasing the performance.

Figure 6:
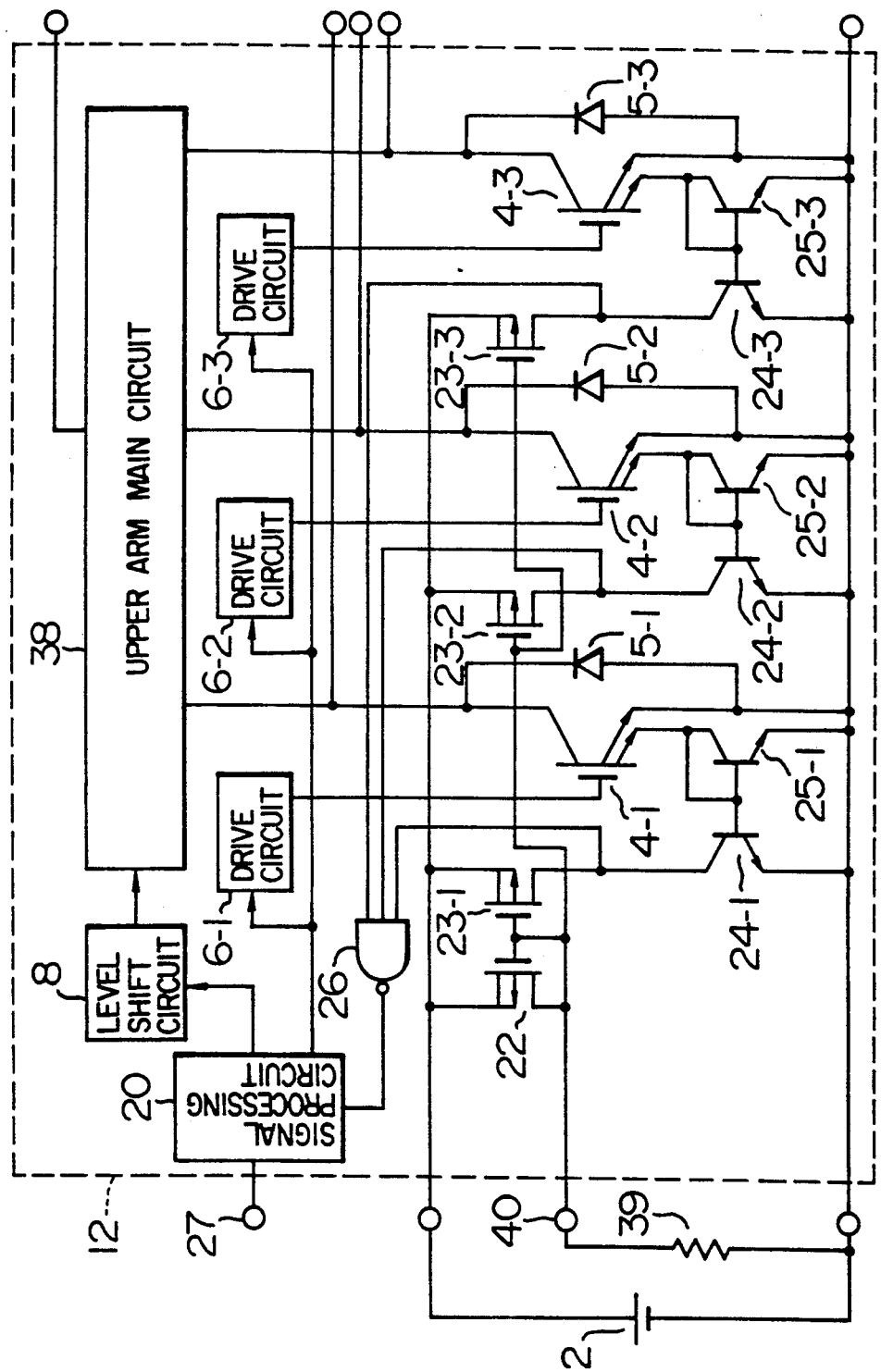
FIG. 6 is a block diagram showing a fourth embodiment of the present invention.

FIG. 6 is a block diagram indicating the circuit of the fourth embodiment of the present invention. In FIG. 6, 38 denotes an upper arm main circuit and 39 denotes a resistor. The other reference numerals represent the parts identical to those indicated in FIGS. 1 to 4.

The circuit of the fourth embodiment of the present invention indicated in FIG. 6 has a construction almost identical to that indicated in FIG. 4 and therefore explanation thereof in detail will be omitted. What is different from the circuit indicated in FIG. 4 consists in that the drain of FET 22 is taken out in the form of a terminal 40 to the exterior of the IC 12 and that the resistor 39 is connected between this terminal 40 and the low potential side terminal of the DC power supply 2. The upper arm main circuit includes IGBTs 4-4 to 4-6, the diodes 5-4 to 5-6 and the upper arm IGBT drive circuits 7-1 to 7-3.

In the fourth embodiment indicated in FIG. 6, the overcurrent detecting circuits are constructed basically identically to those used in the second embodiment of the present invention explained, referring to FIG. 4, but the method for setting the reference current is different. By using this setting method, apart from the fact that the overcurrent level can be varied arbitrarily from the exterior, the temperature rise of the resistor 39 is smaller than that observed within the IC 12 and it is possible to suppress variations in the reference current due to variations in the temperature to small values. Further, in the present embodiment, it is possible to set the value of the overcurrent for the three phases by using one resistor and thus conserve parts.

Figure 7:
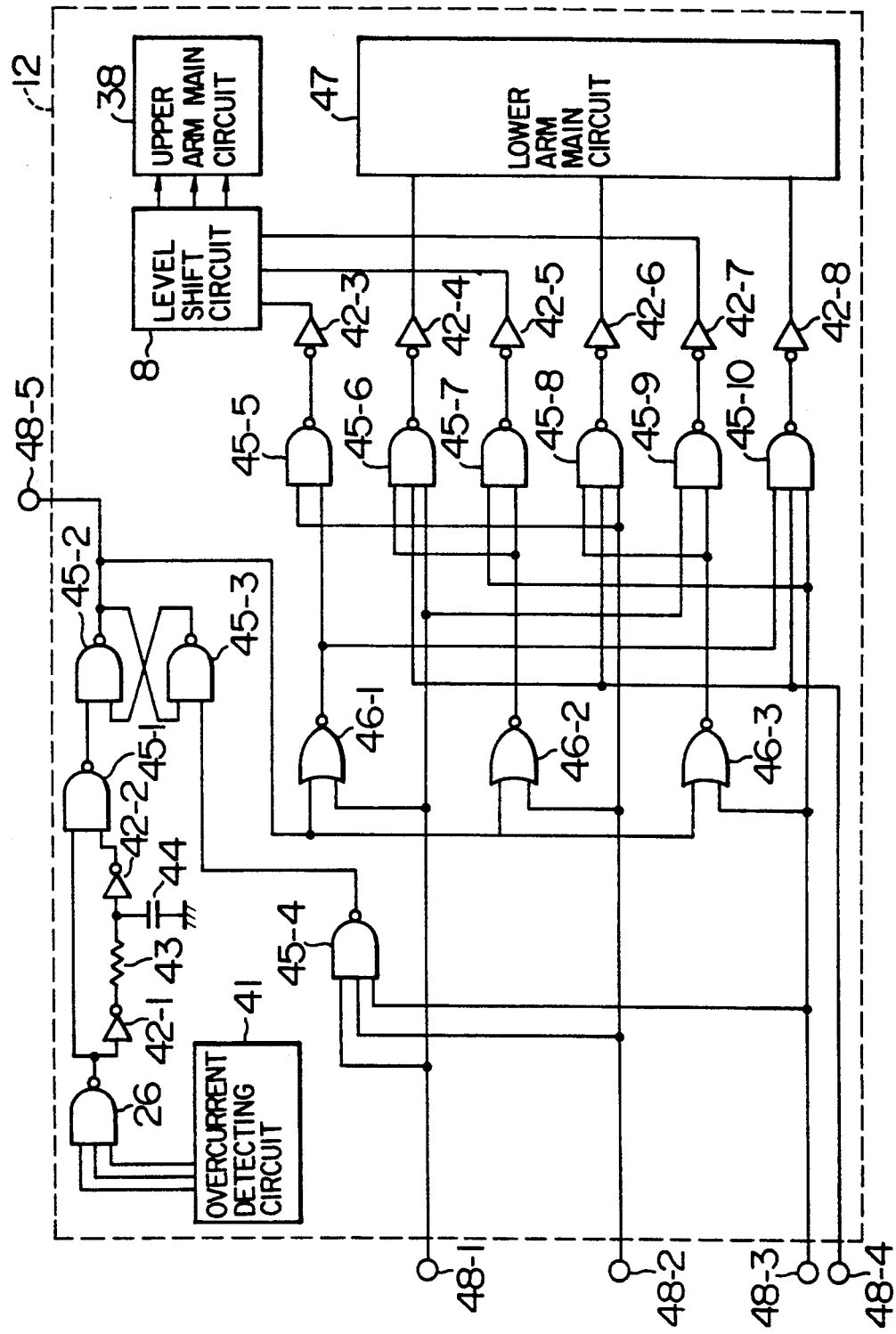
FIG. 7 is a block diagram showing a fifth embodiment of the present invention.

FIG. 7 is a block diagram indicating the fifth embodiment of the present invention and FIGS. 8a to 8j show waveforms for explaining the operation thereof. In FIG. 7, reference numeral 41 denotes an overcurrent detecting circuit; 42-1 to 42-8 NOT circuits; 43 a resistor; 44 a capacitor; 45-1 to 45-10 NAND circuits; 46-1 to 46-3 NOR circuits; 47 a lower arm main circuit of the inverter; and the other reference numerals parts identical to those indicated in FIGS. 1 to 4.

The circuit according to the fifth embodiment of the present invention illustrated in FIG. 7 indicates the signal processing circuit 20 in FIG. 4 or 6 in detail. This signal processing circuit 20 has four input terminals 48-1 to 48-4 and generates six signals, starting from the four signals at the input terminals by means of the NOR circuits 46-1 to 46-3 and the NAND circuits 45-6 to 45-10 to form six signals at the output of the NOT circuits 42-3 to 42-8.

Among these signals the output signals of the NOT circuits 42-3, 42-5 and 42-7 are inputted in the level shift circuit 8. On the other hand, the output signals of the NOT circuits 42-4, 42-6 and 42-8 are inputted to the lower arm IGBT drive circuit. Numeral 47 represents a lower arm main circuit, while numeral 38 represents an upper arm main circuit including IGBTs, diodes and IGBT drive circuits. (See, for example, the chain block 38 shown in FIG. 4)

Among the four input signals the three input signals through the input terminals 48-1 to 48-3 are inputted to one NAND circuit 45-3 of the NAND circuits 45-2 and 45-3 constituting an RS flip-flop through the NAND circuit 45-4. On the other hand output signals of the overcurrent detecting circuit 41 are brought together in one signal by the NAND circuit 26. The output signal thereof is divided into two signals, one of which is inputted directly to a first input terminal of the NAND circuit 45-1 and the other of which is inputted to a second input terminal of the NAND circuit 45-1 through a NOT circuit 42-1, a resistor 43, a capacitor 44 and a NOT circuit 42-2, the capacitor 44 being connected between the connection point between the resistor 43 and the NOT circuit 42-2 and the ground.

The output of the NAND circuit 45-1 is inputted to the NAND circuit 45-2 constituting the RS flip-flop described above. The output of the flip-flop is inputted to the NOR circuits 46-1 to 46-3 and at the same time outputted to the exterior of the IC 12 through an output terminal 48-5.

In the signal waveforms for explaining the operation of the fifth embodiment of the present invention indicated in FIGS. 8a to 8j, the signals inputted to the input terminals 48-1 to 48-4 indicated in FIG. 7 have waveforms indicated by u, v, w and PWM in FIGS. 8a to 8d, respectively. The waveforms of the output signals of the NOT circuits 42-3, 42-5 and 42-7 are indicated by U+, V+ and W+ and the waveforms of the output signals of the NOT circuits 42-4, 42-6 and 42-8 are indicated by U−, V− and W−, respectively, in FIGS. 8e to 8j.

Now the operation of the fifth embodiment of the present invention described above will be explained.

The four kinds of input signals u, v, w and PWM inputted through the input terminals 48-1 to 48-4 are transformed into the six waveforms U+, V+, W+, U−, V− and W− by the NOR circuits 46-1 to 46-3, the NAND circuits 45-5 to 45-10 and the NOT circuits 42-3 to 42-8.

The output of the overcurrent detecting circuit 41 is at the H (high) level at the normal state and the output of the NAND circuit 45-2 constituting the RS flip-flop is at the L (low) level. At this time the NOR circuits 46-1 to 46-3 act as NOT circuits. In this way the six signals described above are outputted and the IC 12 performs the inverter operation.

However, when the overcurrent detecting circuit 41 detects overcurrent and is driven, the output of the NAND circuit 26 is turned to be at the H level and the flip-flop is inverted so that the output signal of the NAND circuit 45-2 is turned to be at the H level. At this time all the outputs of the NOR circuits 46-1 to 46-3 are turned to be at the L level, regardless of the state of the input signals u, v and w. As a result, all the six output signals described above of the NOT circuits 42-3 to 42-8 are turned to be at the L level so that the inverter operation of the IC 12 is interrupted.

In the fifth embodiment of the present invention described above there is disposed the output terminal for indicating it outside of the IC 12 that the interruption state is realized, by outputting the output of the flip-flop to the exterior.

In order to remove the interruption state described above, it is sufficient to input H level signals to all the input terminals 48-1 to 48-3 stated above. In this way the output of the NAND circuit 45-4 is turned to the L level, the output of the flip-flop is reset; the output signal of the NAND circuit 45-2 returns to the L level; and the IC 12 is turned to the state where it can be driven.

Further, in the fifth embodiment of the present invention, a mask circuit is added to the signal processing stage in the overcurrent detecting circuit 41. This circuit is operated as follows.

That is, the overcurrent state takes place in the inverter circuit and as soon as the output of the NAND circuit 26 is changed from the L level to the H level, as described above, the signal, which is turned to the H level, is inputted to one of the inputs of the NAND circuit 45-1. However, since there is disposed a time constant circuit having the resistor 43 and the capacitor 44, a signal at the H level delayed by a predetermined time is inputted to the other input of the NAND circuit 45-1, after the output of the NAND circuit 26 has been changed to the H level.

For this reason, the output of the NAND circuit 45-1 is delayed by a predetermined time with respect to the output of the NAND circuit 26. In the case where the time where the output of the NAND circuit 26 is turned to the H level is shorter than this delay time, the output of the NAND circuit 45-1 is not changed.

In the fifth embodiment of the present invention described above, since it is possible to form the signals for driving the six IGBTs for the three phases by inputting the four kinds of signals, it is possible to decrease the number of input signal lines and the number of externally mounted parts such as a photocoupler for inputting signals, etc.

Further, according to the fifth embodiment of the present invention it is possible to interrupt all the arms by detecting overcurrent by means of a circuit including a small number of elements and further to omit the reset terminal, which resets the whole circuit after an interruption of the inverter operation by setting all the three input signals at the H level to reset the flip-flop.

Still further, according to the fifth embodiment of the present invention no erroneous operations take place, because overcurrent in a predetermined time is masked so that noise in the overcurrent detecting circuit and current at the diode recovery are not considered as overcurrent.

Furthermore, although, in general, excessive current flows through the switching elements at the beginning of the conduction, according to the fifth embodiment of the present invention, owing to the masking function described above, the overcurrent protection means doesn't operate in a predetermined time after the beginning of the conduction of the switching elements and therefore it is possible to prevent interruption of the operation of the inverter circuit due to excessive current at the conduction of the switching elements.

The fifth embodiment of the present invention has the effects as described above and all of these effects are particularly useful, in the case where the embodiment is realized in the form of a monolithic IC.

Figure 9:
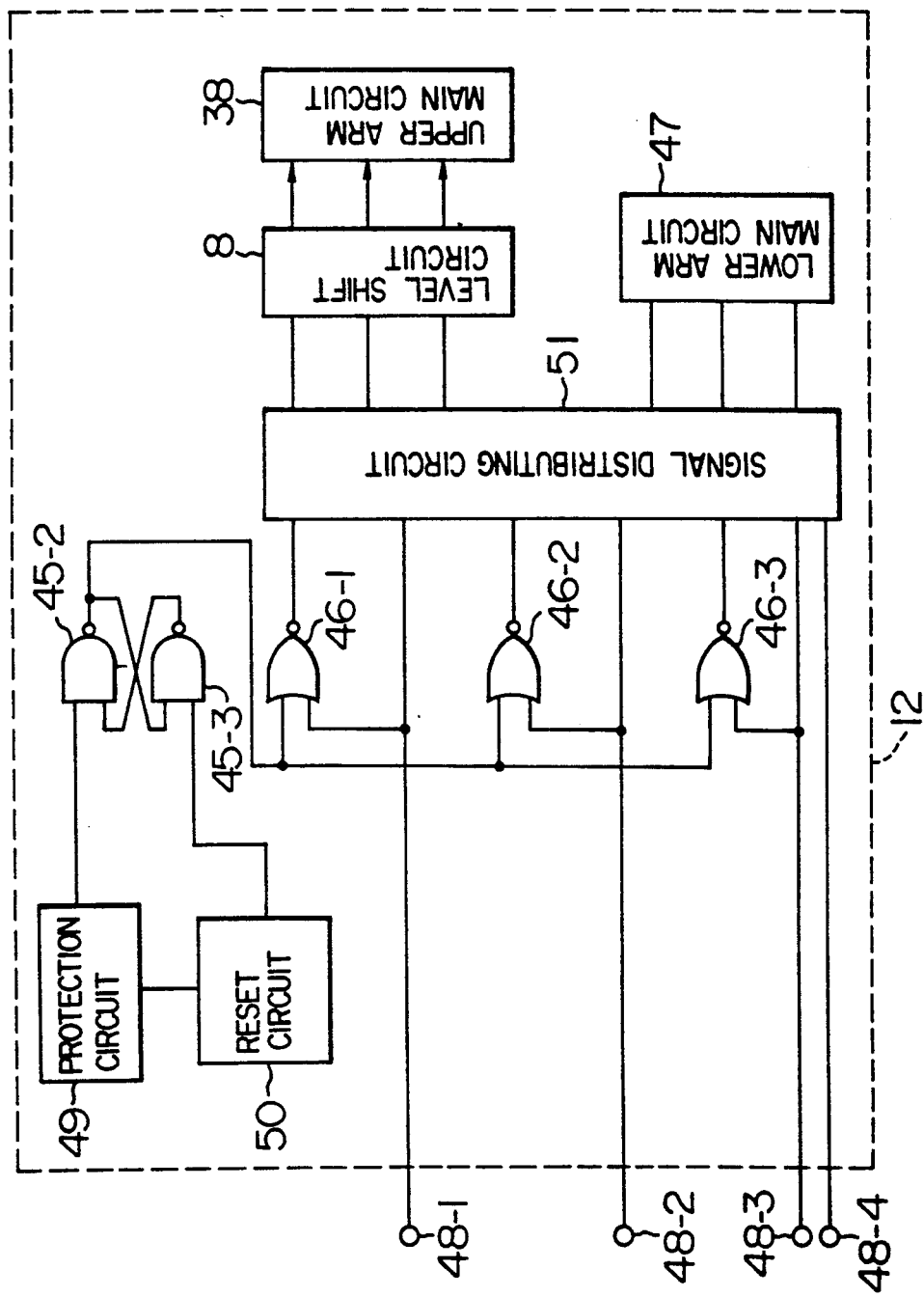
FIG. 9 is a block diagram showing a sixth embodiment of the present invention.

FIG. 9 is a block diagram indicating the circuit in the sixth embodiment of the present invention. In FIG. 9, reference numeral 49 denotes an overcurrent protection circuit; 50 a reset circuit; 51 a signal distributing circuit; and the other reference numerals parts identical to those used in FIG. 7.

The circuit construction in the sixth embodiment of the present invention indicated in FIG. 9 is almost identical to that indicated in FIG. 7 and explanation thereof in detail will be omitted.

In FIG. 9, the signal distributing circuit 51 is constructed similarly to that indicated in FIG. 7.

In this sixth embodiment the reset circuit 50 is a circuit for resetting the flip-flop having the NAND circuits 45-2 and 45-3 and what is different from that used in the fifth embodiment explained referring to FIG. 7 consists in that the reset signal is not inputted from the exterior, but the state of the overcurrent protection circuit 49 is observed and the reset signal is outputted automatically, when predetermined conditions are fulfilled.

That is, when predetermined conditions are fulfilled such that current, voltage, temperature, etc. are in a normal state, that the overcurrent protection circuit 49 returns from an abnormal state to a normal state, that a predetermined time has been lapsed, after the flip-flop has been inverted, and so forth, the reset circuit 50 gives the NAND circuit 45-3 a signal, which resets the flip-flop and turns the inverter IC 12 to the state where it can be operated. For this reason, according to the sixth embodiment of the present invention, even in the case where it is in an abnormal state and the operation of the inverter circuit is stopped, when the abnormal state disappears, the inverter circuit can be operated automatically.

According to the sixth embodiment of the present invention described above, in the case where it is desired not to stop the motor even if the overcurrent protection circuit is driven due to overcurrent, etc., the inverter circuit can be restarted automatically after the lapse of a predetermined time or the recovery of the overcurrent protection circuit.

As explained above, according to the embodiments of the present invention, a three-phase bridge inverter circuit having a high withstand or breakdown voltage for controlling motor can be integrated in one chip and therefore it is possible to fabricate inverter circuits cheaply in mass production. In addition, since it can be driven by inputting directly a DC voltage obtained by rectifying the commercial AC 100 V, no voltage lowering transformer is necessary and therefore it is possible to reduce significantly the volume of a system using an inverter circuit.

Further, since it is formed in an IC using a dielectric isolating substrate, it is possible to reduce the isolating distance between constituent elements in the IC with respect to that obtained by using a conventional pn isolation substrate and thus to decrease the chip area. Still further, since, in the dielectric isolating substrate, interference between constituent elements is extremely small, the property for preventing erroneous operations due to noise in the inverter circuit can be improved. Furthermore it is possible to form arbitrarily constituent elements of various structures in a same chip and as the result to effect easily circuit design in a short period of time.

Further, since not only the inverter but also protecting circuits such as the overcurrent detecting circuit, the temperature detecting circuit, etc. are incorporated in the monolithic IC, when excessive current flows through output switching elements, when the temperature of the chip is raised abnormally, etc., it is possible to shorten significantly the delay time from the point of time, where an abnormality in the IC is detected, to the point of time, where a self protecting operation is effected, and to detect the temperature of the chip without interruption to control the peak value of the current flowing through the output switching elements, depending on the temperature. In this way, it is possible to improve the usability of the inverter and to increase the reliability thereof.

We claim:

1. A three-phase bridge inverter circuit receiving electric power from a DC power supply and converting the DC power into AC power, comprising:
   six switching elements constituting said inverter;
   six diodes;
   a drive circuit controlling a conductive state and a cut-off state of said switching elements for different phases;
   a level shift circuit for converting a signal with reference to a low potential side electrode of said DC power supply into a signal with reference to one of main electrodes of the switching elements on a high potential side among said switching elements;
   means for detecting the state of said switching elements; and
   means for detecting the temperature of the inverter circuit;
   wherein at least said six switching elements are isolated from one another by forming them in a semiconductor region isolated by a dielectric body, all of which are formed together in the form of a monolithic IC.

2. An inverter circuit according to claim 1, wherein the voltage of said DC power supply is higher than 100 V.

3. An inverter circuit according to claim 1, wherein said means for detecting the state of said switching elements detects current flowing through at least three of said switching elements on the low potential side among said switching elements.

4. An inverter circuit according to claim 3, further comprising overcurrent protection means, which, in the case where current flowing through at least one switching element among said three switching elements on the low potential side exceeds a predetermined value, generates a signal outside of the monolithic IC and at the same time brings the three switching elements on the low potential side or the three switching elements on the high potential side or six if the switching elements into the cut off state.

5. An inverter circuit according to claim 4, wherein a level set for said predetermined current value, at which said overcurrent protection function begins an operation, is varied, depending on the temperature detected by said temperature detecting means.

6. An inverter circuit according to claim 4, having a function of removing automatically said cut off state after the lapse of a predetermined time, when said switching elements are brought into the cut off state.

7. An inverter circuit according to claim 4, wherein a level set for said predetermined current value, at which said overcurrent protection function begins an operation, can be set arbitrarily outside of the inverter circuit.

8. An inverter circuit according to claim 1, further comprising terminals, through which at least four kinds of signals are inputted, and a logic circuit for forming a signal controlling the conductive and cut-off state of said six switching elements, starting from said at least four kinds of signals.

9. An inverter circuit according to claim 7, further comprising terminals, through which at least four kinds of signals are inputted, and a logic circuit for forming a signal controlling the conductive and cut-off state of said six switching elements, starting from said at least four kinds of signals.

10. An inverter circuit according to claim 1, wherein said switching elements are IGBTs (Insulated Gate Bipolar Transistors).

11. An inverter circuit according to claim 1, wherein three of said six switching elements which are on a low potential side are controlled by PWM (Pulse Width Modulation) Method.

12. An inverter circuit according to claim 10, wherein three of said six switching elements on a high potential side are switched with a frequency synchronized with an angular frequency of a motor, which is a load.

13. An inverter circuit according to claim 4, wherein the operation of said overcurrent protection means is interrupted during a predetermined time from the point of time, where said switching elements on the low potential side become conductive.

14. An electric motor unit comprising an electric motor and an inverter implemented in the form of a monolithic IC device incorporated into said motor, wherein said inverter includes:
   a first group of switching elements and a second group of switching elements, an electric current flowing into said motor from said first group of switching elements and flowing out of said motor to said second group of switching elements;
   a drive circuit for controlling said switching elements in response to a control signal;
   current detecting circuit for detecting electric current flowing in said second group of switching elements; and
   a temperature detecting circuit for detecting a temperature of said monolithic IC device and controlling an operation state of said switching elements in accordance with the detected temperature.

15. An electric motor unit according to claim 14, wherein said motor is placed in a motor case, and said monolithic IC device is disposed in a package provided with heat dissipation fins, wherein said package is electrically and thermally coupled to said motor case.

16. An electric motor unit according to claim 14, wherein a shielded line is electrically connected with said monolithic IC device and said control signal is supplied to said switching elements through said shielded line.

17. An electric motor unit according to claim 14, wherein said inverter in the form of a monolithic IC device further includes a reference level setting circuit having a reference level which changes in accordance with an output of said temperature detecting circuit for controlling an operation state of said switching elements.

18. An electric motor unit according to claim 14, wherein said current detecting circuit generates a turn-off signal for turning off the switching elements when the detected current exceeds a predetermined value and said monolithic IC device has a terminal with a signal which indicates that said switching elements are being turned off.

19. An electric motor unit according to claim 14, wherein said temperature detecting circuit generates a turn-off signal for turning off the switching elements when the detected temperature exceeds a predetermined value and said monolithic IC device has a terminal with a signal which indicates that said switching elements are being turned off.

20. An electric motor unit according to claim 14, further comprising:
   a circuit for charging a capacitor which serves as a power source for said first group of switching elements.

* * * * *